United States Patent
Wynne

(10) Patent No.: US 9,924,811 B2
(45) Date of Patent: Mar. 27, 2018

(54) GIFT KIT

(71) Applicant: Arena Online Limited, London (GB)

(72) Inventor: William Robert Wynne, Chelsea Court (GB)

(73) Assignee: Arena Online Limited, London (GB)

( * ) Notice: Subject to any disclaimer, the term of this patent is extended or adjusted under 35 U.S.C. 154(b) by 153 days.

(21) Appl. No.: 14/380,722

(22) PCT Filed: Feb. 22, 2013

(86) PCT No.: PCT/GB2013/050429
§ 371 (c)(1),
(2) Date: Aug. 24, 2014

(87) PCT Pub. No.: WO2013/128167
PCT Pub. Date: Sep. 6, 2013

(65) Prior Publication Data
US 2015/0040470 A1    Feb. 12, 2015

(30) Foreign Application Priority Data
Feb. 29, 2012  (GB) .................................. 1203532.5

(51) Int. Cl.
*A01G 9/00*    (2018.01)
*B65D 85/50*    (2006.01)
(Continued)

(52) U.S. Cl.
CPC ............ *A47G 7/063* (2013.01); *A01G 9/088* (2013.01); *A01G 9/108* (2013.01); *B65D 81/36* (2013.01); *B65D 85/505* (2013.01)

(58) Field of Classification Search
CPC ...... A01G 9/088; A01G 9/108; B65D 85/505; B65D 85/52
(Continued)

(56) References Cited

U.S. PATENT DOCUMENTS 1,493,152 A * 5/1924 Gardner ............... B65D 5/5002
206/423
4,075,786 A * 2/1978 van Zyl .................. B65D 85/52
206/423
(Continued)

FOREIGN PATENT DOCUMENTS

DE   202006003071   7/2006
EP   0395827   11/1990
(Continued)

OTHER PUBLICATIONS

International Search Report and Written Opinion from corresponding International Application No. PCT/GB2013/050429, dated Nov. 8, 2013.
(Continued)

*Primary Examiner* — David J Parsley
(74) *Attorney, Agent, or Firm* — Renner Otto Boisselle & Sklar, LLP

(57) ABSTRACT

A flower gift kit, the gift kit comprising: a flower; an enclosure; a presentation tray for the flower inserted in the enclosure; an insert configured to be flat beneath the presentation tray and between the presentation tray and the enclosure of the flower; wherein the insert comprises predetermined fold lines; and wherein the insert is user-erectable into a 3D stand for the flower using the predetermined fold lines.

20 Claims, 6 Drawing Sheets

(51) Int. Cl.
*A47G 7/06* (2006.01)
*A01G 9/08* (2006.01)
*A01G 9/10* (2006.01)
*B65D 81/36* (2006.01)

(58) Field of Classification Search
USPC .................. 47/39, 41.01, 41.15, 44, 84
See application file for complete search history.

(56) References Cited

U.S. PATENT DOCUMENTS

| | | | | |
|---|---|---|---|---|
| 4,662,107 A * | 5/1987 | Van Den Kieboom | B65D 85/52 | 47/72 |
| 4,941,572 A | 7/1990 | Harris | | |
| 5,710,641 A * | 1/1998 | Lowry | B65D 5/4233 | 358/462 |
| 6,167,653 B1 * | 1/2001 | Van den Kieboom | B65D 85/52 | 208/423 |
| 6,227,439 B1 * | 5/2001 | Hansen | A47G 7/063 | 229/104 |
| 6,419,087 B1 * | 7/2002 | Peters | B65D 5/4295 | 206/423 |
| 6,463,697 B2 * | 10/2002 | Weder | B65D 85/505 | 211/74 |
| 6,484,442 B1 * | 11/2002 | Weder | A47G 7/085 | 47/72 |
| 6,591,550 B2 * | 7/2003 | Gilbert | A01G 5/06 | 206/423 |
| 7,007,426 B1 * | 3/2006 | Ohlman, III | B65D 85/52 | 47/84 |
| 8,985,329 B2 * | 3/2015 | Ullrich | B65D 5/503 | 206/423 |
| 9,096,366 B2 * | 8/2015 | Sabogal | A01N 3/00 | |

FOREIGN PATENT DOCUMENTS

| | | |
|---|---|---|
| EP | 2154077 | 2/2010 |
| FR | 2837803 | 10/2003 |
| GB | 2379874 | 3/2003 |
| JP | H03191909 | 8/1991 |
| JP | 2007254029 | 10/2007 |

OTHER PUBLICATIONS

Combined Search and Examination Report from corresponding UK Application No. GB1203532.5, dated Jun. 27, 2012.
Examination Report from corresponding UK Application No. GB1203532.5, dated Sep. 21, 2012.

* cited by examiner

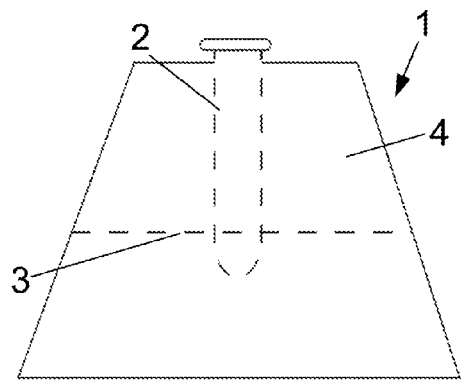
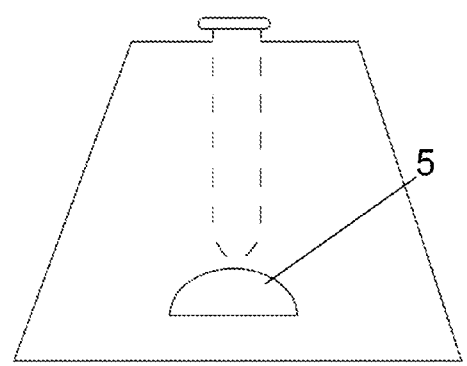
Fig. 1(a)　　　　　　　　Fig. 1(b)
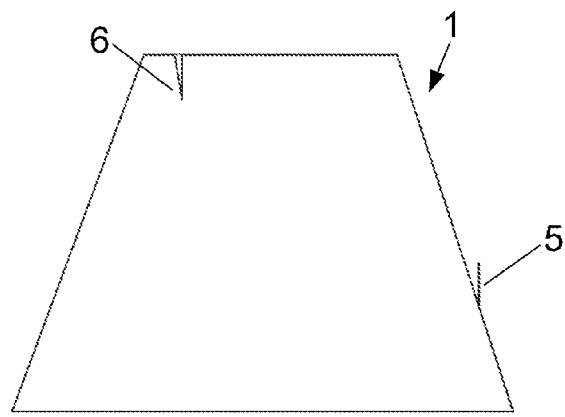
Fig. 2

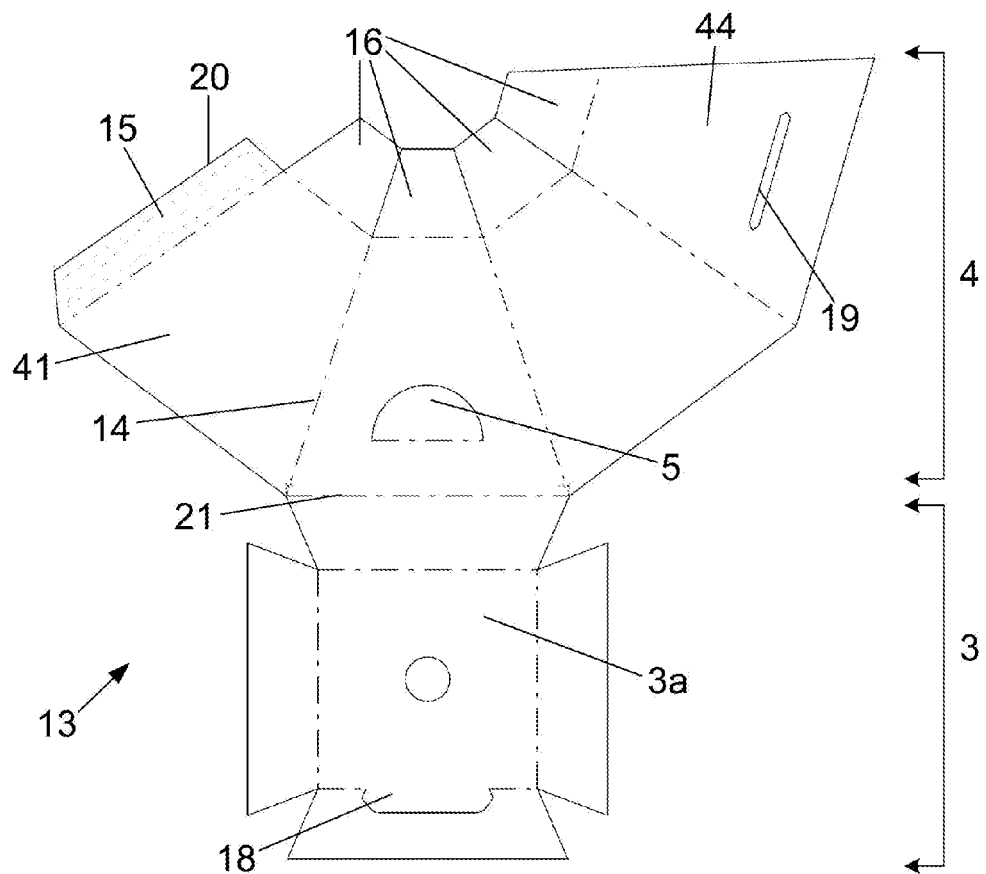
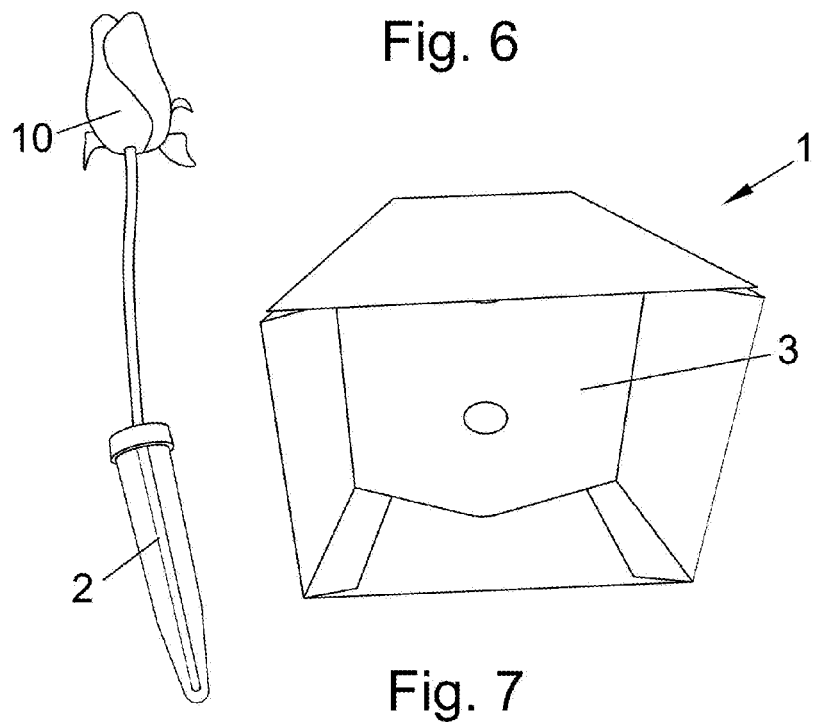
Fig. 6
Fig. 7

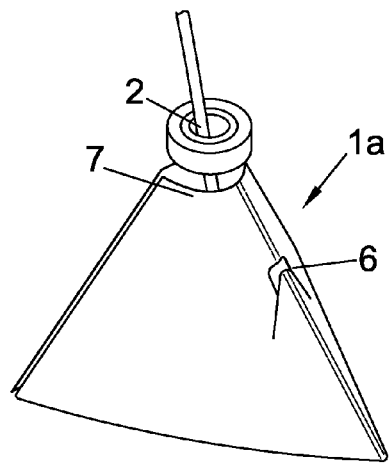
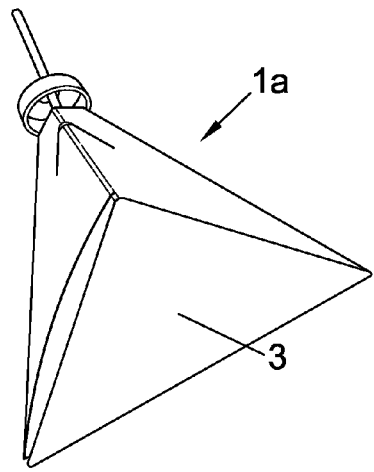
Fig. 8(a)  Fig. 8(b)
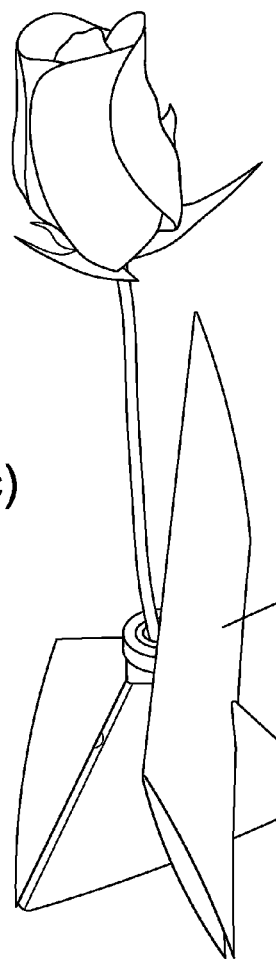
Fig. 8(c)

GIFT KIT

FIELD OF THE INVENTION

This invention relates to flower gift kit delivery boxes, carton blanks for such boxes and to related methods.

BACKGROUND TO THE INVENTION

Techniques are known for delivering flowers and disposable flower containers to recipients by post. The disposable flower container is either pre-assembled or requires assembling by the recipient. However, technical limitations of current flower gift kits make them expensive as they are often made from water-proof materials or comprise water-proof linings. Furthermore, recipients are required to follow complicated instructions to assemble the disposable flower container.

Background prior art can be found in U.S. Pat. No. 3,973,356, WO 88/01593, CA2619453, EP0234139 and EP1076010. Further background prior art can be found in GB2379874 and JP2007 254029

SUMMARY OF THE INVENTION

According to a first aspect of the invention there is provided a flower gift kit, the gift kit comprising: an enclosure; a presentation tray for a flower; an insert configured to be generally flat beneath said presentation tray between said presentation tray and a flower of said enclosure; and wherein said insert is user-erectable into a 3D stand for said flower.

Broadly speaking, the invention provides a way to deliver a single cut flower for display on, for example, a recipient's desk. Conventionally, bouquets of cut flowers are delivered by couriers and are either supplied in or require a container such as a vase to enable the flowers to be displayed. This may not be suitable for individuals with insufficient desk space or those without a vase. Since these individuals may still wish to receive flowers, the gift kit provides a solution. The compact flower display stand contained within the kit removes the need for the individual to own a vase, and further makes the gift kit interactive by requiring the recipient to "create" the stand. A single cut flower also requires less desk space than a vase. Furthermore, the gift kit is packaged in a transport container that has dimensions suitable for posting through a standard residential letter box. This has the advantage that the recipient of the gift kit is not inconvenienced by needing to stay at home in anticipation of a courier, and the sender can be sure that the recipient receives the gift.

The insert may be converted by the recipient of the gift into a 3D flower stand by folding the insert according to either simple instructions supplied in the gift kit, or by following instructions printed on the insert itself. The insert is designed so that the recipient can create the 3D stand without the need of additional materials or tools.

In a preferred embodiment, the flower gift also comprises a tube containing water for a stem of the flower, such that the erected flower stand comprises a holder for said tube. Once the insert has been folded into a flower stand, the tube can be inserted into the stand and the recipient can display the flower in its stand on their desk. The tube can be tapered at the end in contact with the end of the stem.

In a preferred embodiment, the flower stand comprises a set of inwardly angled flaps around an aperture for the tube. The flaps are part of the opening of the flower stand into which the flower tube is inserted. The flaps tend to close the opening of the stand (closed state), but the flaps are spring-like such that applying a force to the flaps by inserting the flower tube into the stand causes the flaps to be pushed towards the inside walls of the stand. The flaps try to return to the closed state and the force of the flaps on the tube enables the tube to be held in an upright position in the stand. The flower stand may also have an internal support for a base of the tube. The internal support has a central hole through which the tapered portion of the tube can be inserted. The dimension of the central hole is less than that of the widest part of the tube, so that the tube cannot slip out through the bottom of the stand. This is especially important when a user lifts the flower stand. The central hole also helps to maintain the upright position of the tube in the stand.

Preferably, the insert is made from a flat sheet of stiff material foldable to erect the stand. The stiff material creates a stand that can support the flower and allows the spring-like inwardly angled flaps described above to be formed.

In a preferred embodiment, the stand has the general shape of a truncated pyramid. The stand may also have a raised internal base. The raised internal base forms an internal support (described above).

Preferably, the gift kit also comprises a gift card. The flower stand is used as a flower holder and a card holder so that the gift card and flower can be displayed together. In order to do so, the insert to make the stand comprises a kiss-cut that becomes a card holder when the 3D stand is erected.

In a preferred embodiment the enclosure of the gift kit is rectangular and the presentation tray is able to hold the flower to lie along a diagonal of said rectangular box. The presentation tray may also comprise one or more additional gift compartments to either side of the diagonal. This allows multiple gifts to be packaged in the same gift without damaging the flower.

In a preferred embodiment a carton blank for the insert is provided.

According to another aspect of the invention there is provided a gift kit comprising a transport container, a cut flower and a flower display stand, wherein the stand is in a compact configuration that enables it to be converted by folding into a 3D stand, and wherein the 3D stand holds the cut flower substantially upright for display.

In a preferred embodiment, the flower display stand is made from a carton blank, wherein the blank comprises pre-determined fold lines and connecting tabs. This facilitates assembly by a user who may not be familiar with how the carton blank is turned into the 3D stand. The carton blank may have edge tabs which are pre-treated with adhesive to enable portions of the carton blank to be affixed together after folding to create said 3D stand. This also facilitates assembly.

In an embodiment, the 3D stand has a base portion, a container portion and an opening. The shape of the stand is frusto-pyramidal, and the stand is oriented such that the wider part of the frustum forms the base of the 3D stand and the narrower part forms the top of the 3D stand. This has the advantage of stabilising the 3D stand and lessening the risk of the stand and flower being knocked over on a desk. In a preferred embodiment, the shape of the 3D stand is a frustum that has a triangular base or a square base. A 3D frusto-conical stand is possible, but this is more complicated to assemble and a pre-cut flap or "kiss cut" on a curved surface would not be able to hold a gift card in place for display. Therefore, at a minimum the frustum needs to have three faces to overcome these problems.

In a preferred embodiment, in a folded 3D configuration the base portion of the 3D stand strengthens the stand and acts as an internal support. The base portion can be flush with the bottom of the stand. However, if the base portion is raised and fixed within the container portion of the stand, the base acts as internal scaffolding linking the faces of the container portion together. Furthermore, if the internal support comprises a central pre-cut hole, the internal support not only strengthens the 3D structure but also enables support of the water-containing tube within the stand, as described above.

In use, the gift kit includes a cut flower is presented within a water-containing tube, wherein the water-containing tube contains water absorbent material to keep said cut flower hydrated during transport and display. The water absorbent material may be florist's foam, sponge or cotton wool. The opening of the 3D stand then has a dimension such that the water-containing tube fits in the opening to maintain a stable upright position within the stand. The container portion of the stand preferably also includes one or more pre-cut slots or flaps into which a gift card can be inserted for display.

According to a further aspect of the invention, there is provided a method of displaying a gift card and cut flower received in a gift kit, the gift kit further comprising a carton blank, the method comprising: folding the carton blank into a frusto-pyramidal shape, wherein the frustum forms a stand for the cut flower; inserting said flower into said stand; and inserting the gift card into pre-cut slots or holder on the sides of the 3D stand.

BRIEF DESCRIPTION OF THE DRAWINGS

The invention is diagrammatically illustrated, by way of example, in the accompanying drawings, in which:

FIGS. 1(a) and (b) show a front and side view of a flower stand according to an embodiment of the invention;

FIG. 2 shows a side view of a flower stand according to an embodiment of the invention;

FIG. 7 shows a square-based frustum according to an embodiment of the invention;

FIGS. 8(a) to (c) show a triangular-based frustum according to an embodiment of the invention;

DETAILED DESCRIPTION OF PREFERRED EMBODIMENTS

Figures 3A, 3B:
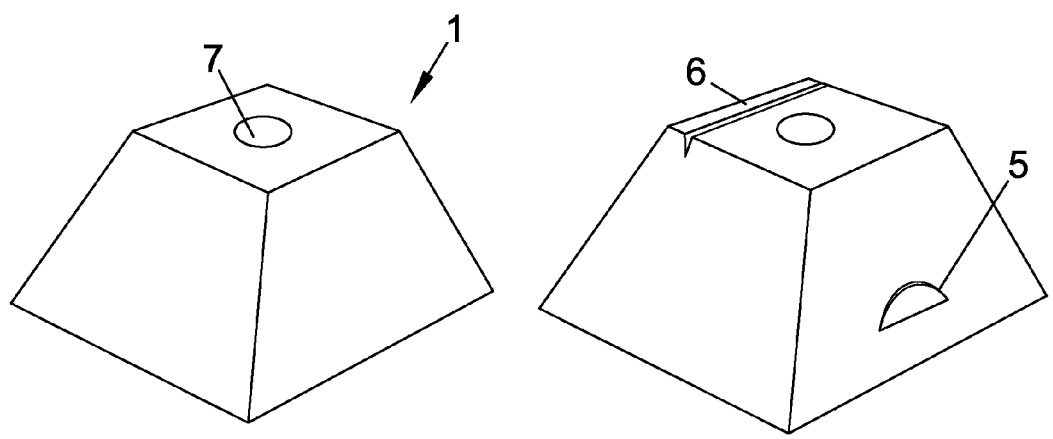
FIGS. 3(a) to (c) show a 3D view of a flower stand according to an embodiment of the invention.

We describe a gift kit comprising a flower and a compact flower stand that can be delivered by post to a recipient. The compact flower stand can be easily erected by the recipient into a 3D stand to hold the flower.

FIGS. 1 (a) and (b) show a front and side view of an erected 3D flower stand 1. The flower stand 1 is designed to hold a water-containing tube 2 in an upright position. The water-containing tube 2 contains a stem of a cut flower, liquid and water absorbent material such as florist's foam, sponge or cotton wool, in order to keep the flower hydrated during transport and display. The 3D flower stand comprises a base portion 3 and a container portion 4. The base portion further comprises an internal support 3a, which assists the stand to maintain the water-containing tube 2 in an upright position. The 3D flower stand may comprise one or more flaps or "kiss-cuts" 5 in the sides of the stand in which a gift card can be inserted for display.

FIG. 2 shows a side view of a 3D flower stand 1. The flower stand 1 may comprise a flap 5 as described above, and may also comprise angled cuts 6 at the top of the stand into which a gift card can be inserted for display.

Figure 3C:
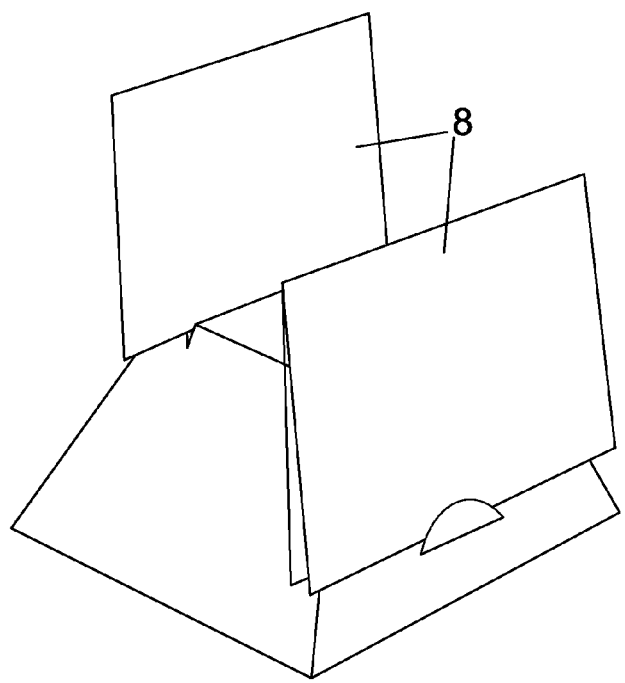

FIGS. 3(a) to (c) show a 3D view of a 3D flower stand 1 in an embodiment of the invention. The stand 1 comprises an opening/aperture 7 for the water-containing tube, and may also comprise flaps 5 and angled cuts 6 for display of gift cards 8.

Figure 4:
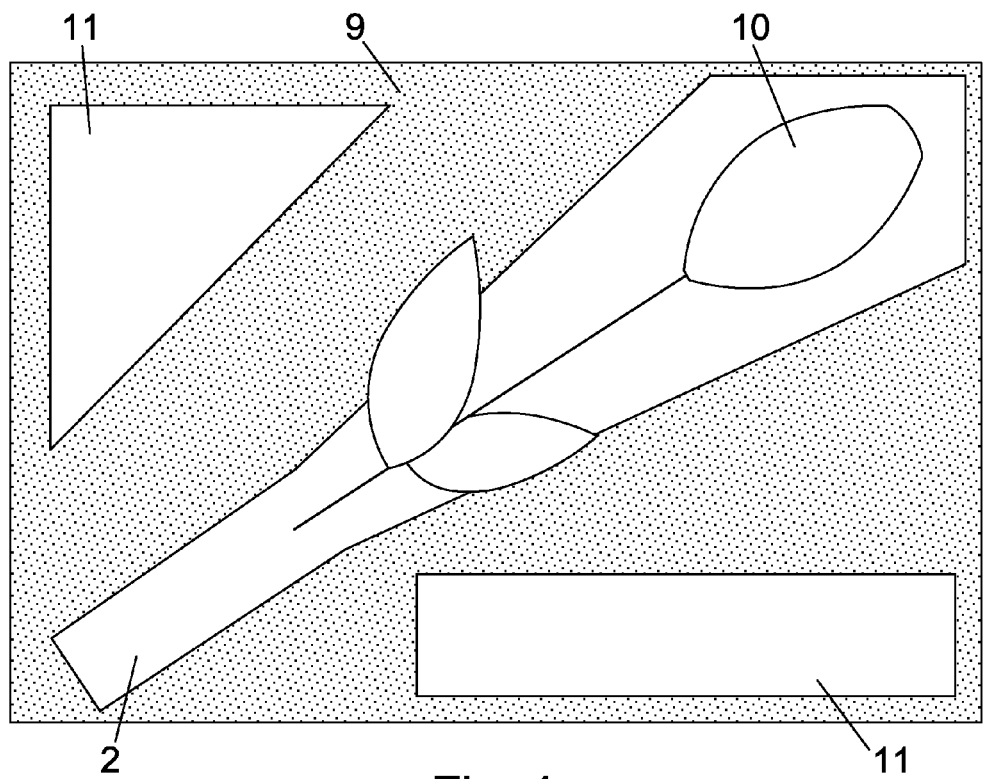
FIG. 4 shows a presentation tray according to an embodiment of the invention.

FIG. 4 shows a top view of a presentation tray 9. The gift kit comprises a transport container or box in which the presentation tray 9 is inserted. The presentation tray is a folded or moulded tray comprising recesses that form compartments. In an embodiment of the invention, one compartment is positioned along the diagonal of the presentation tray 9, and is used to hold a flower 10. The presentation tray may comprise additional compartments 11 on either side of the diagonal compartment, which may be used to hold other gifts included in the gift kit.

Figure 5:
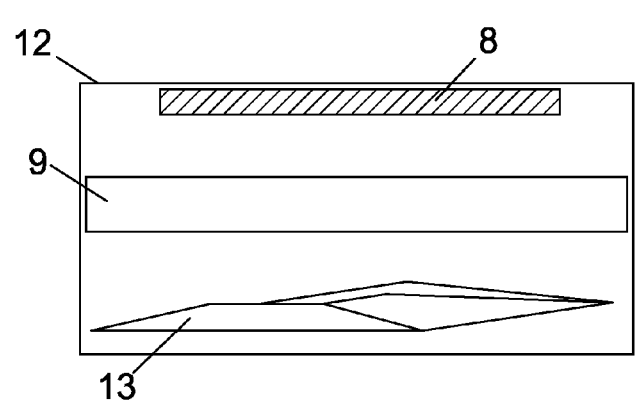
FIG. 5 shows an arrangement of a flower gift kit according to an embodiment of the invention.

FIG. 5 is a schematic cross-sectional view from the side of how the gift kit is assembled. The gift kit comprises a transport container/box 12. An insert 13, which may be a carton blank, and which is a compact version of the 3D flower stand, is located at the bottom of the box 12. A presentation tray 9 is inserted above this. A gift card 8 is either placed on the top of the presentation tray or is affixed with a non-permanent adhesive to the inside of the lid of the box 12 (as shown), such that the card can be removed from the lid and displayed on the flower stand as described above.

Figure 6A:
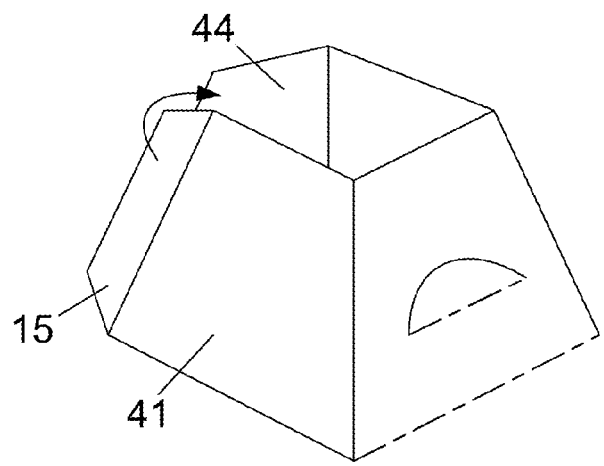
FIGS. 6(a) to 6(c) illustrate how the carton blank can be transformed into a 3D stand.

FIG. 6 shows an example of a carton blank 13 which forms the insert of the gift kit. The carton blank depicted is for a flower stand with four side faces (square base), as per FIG. 1(b), and comprises various different parts. Solid lines 20 define edges or parts that are pre-cut and dashed lines 14 define pre-folded lines which guide the user on how to quickly and simply fold the carton blank into a 3D stand. The carton blank shown has a container portion 4 and a base portion 3. The container portion 4 is made in this case from four trapezium-shaped faces. Each face is connected to an inwardly angled flap 16. The first face 41 is connected to a joining tab 15 that is pre-treated with adhesive and which is used to join together the first face 41 and the fourth face 44 after the user has created the container portion (as described below). A "front face" has a pre-cut flap or "kiss-cut" 5 for displaying a gift card, and is also connected to the base portion 3. The "back face" is separated from the "front face" by one face. The "back face" has a pre-cut slot 19 that is used to fasten the loose end of the base portion to the container portion. The pre-cut slot is necessarily located on the "back face" as this results in the joint 21 (between the container portion and the base portion) and the pre-cut slot 19 being on opposite sides of the base, which aids to stabilise the base portion. The base portion 3 comprises an internal support 3a which acts to strengthen the 3D stand and support the base of the water-containing tube. The water-containing tube is inserted through an opening/aperture, which comprises a set of inwardly angled flaps 16 that act to support the water-containing tube.

The carton blank can be transformed by the recipient of the gift kit into a 3D stand.

Firstly, the user creates the container portion 4 of the 3D stand. To do this, the user folds the carton blank along the pre-folded lines that define the four trapezium-shaped faces of the stand. Each fold is a mountain fold such that the segment to the right of the fold line is folded behind the segment to the left of the fold line. The structure now resembles FIG. 6(a) (the unfolded base portion and the inwardly angled flaps of the carton blank have been omitted from the figure for simplicity). Joining tab 15 is connected to the first face 41 of the stand. The joining tab is folded such that its outer side (which is pre-treated with adhesive) abuts the inner side of the fourth face 44 of the stand, as indicated by the arrow. The user applies gentle pressure to affix the joining tab to the fourth face 44, which completes the container portion.

Figure 6B:
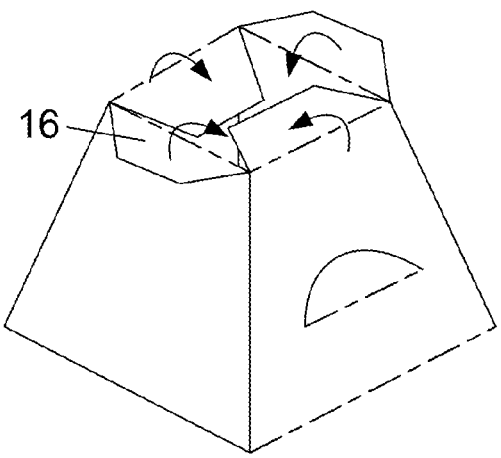

Secondly, the user completes the opening of the 3D stand. The user folds the fold lines of the inwardly-angled flaps 16 using mountain folds such that the flaps are folded into the container portion, as shown in FIG. 6(b) (the base portion has been omitted from the figure for simplicity). As described earlier, the stiffness of the carton blank material gives the flaps spring-like properties. The flaps partially close the opening of the 3D stand. When the water-containing tube is inserted into the opening the flaps are pushed apart and exert a force on the tube as they try to return to the closed state. This enables the tube to be maintained in an upright position in the stand.

Figure 6C:
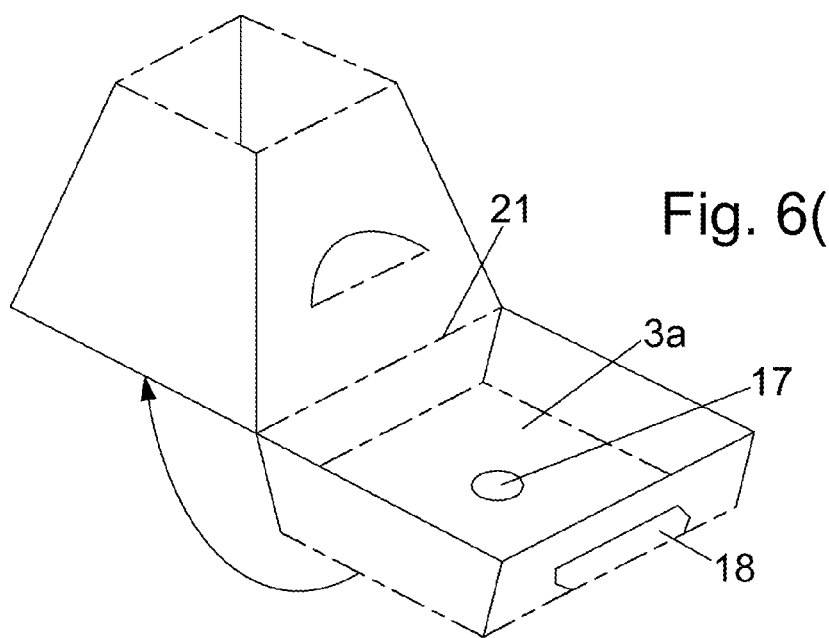

Finally, the user creates the base portion 3 of the 3D stand. The base portion comprises a square internal support 3a and four trapezium-shaped tabs that help to position the internal support 3a within the container portion 4. One of the trapezium-shaped tabs is connected to the container portion of the stand by joint 21. The square base part has a pre-cut central hole 17 which is used to guide the water-containing tube into an upright orientation within the stand. One of the trapezium-shaped tabs comprises a pre-cut fastening tab 18. The fastening tab 18 has notches that form a catch. The user folds the four tabs along the fold lines using valley folds to create the base portion, as shown in FIG. 6(c). The tab connected to the container portion is folded along the joint 21 so that the base portion is folded up into the bottom of the container portion, as shown in FIG. 6(c) (the inwardly-angled flaps have been omitted from the drawing for simplicity). The "back face" of the container portion has a pre-cut slot 19. The fastening tab 18 is inserted into the pre-cut slot 19 and in doing so, the internal support is secured in place within the container portion. The catch of the fastening tab 18 prevent the tab from slipping out of the slot, thereby securing the tab and the base in place. The base portion is raised above the bottom of the container portion, as shown in FIG. 7.

FIG. 7 shows a view of the square-based frusto-pyramidal flower stand 1. The base portion 3 of the stand is raised such that it is positioned within the container portion of the stand. The hole in the centre of the internal support 3a is used to guide the water-containing tube 2 into an upright, vertical orientation within the stand.

FIGS. 8(a) to (c) show views of an alternative embodiment of the frusto-pyramidal flower stand with a triangular base 1a. The base of the stand 3 is flush with the bottom of the stand, and so there is no internal base or support. The stand also has a pre-cut slot 6 for holding a gift card 8.

No doubt many other effective alternatives will occur to the skilled person. For example, the skilled person will understand that in the above-described embodiments, the flower could be substituted for a cigar or suitable alternative gifts. It will be understood that the invention is not limited to the described embodiments and encompasses modifications apparent to those skilled in the art lying within the scope and spirit of the claims appended hereto.

The invention claimed is:

1. A flower gift kit, the gift kit comprising:
a flower;
an enclosure;
a presentation tray for said flower inserted in the enclosure;
an insert configured to be flat beneath said presentation tray and between said presentation tray and said enclosure of said flower wherein said insert comprises pre-determined fold lines, wherein the whole of the insert is flat below the presentation tray; and
wherein said insert is user-erectable into a 3D stand for said flower using said pre-determined fold lines, and the pre-determined fold lines guide a user how to fold the insert to erect the 3D stand.

2. The flower gift kit as claimed in claim 1, further comprising a tube containing water for a stem of said flower, and wherein said erected flower stand comprises a holder for said tube.

3. The flower gift kit as claimed in claim 2 wherein said erected flower stand comprises a set of inwardly angled flaps around an aperture for said tube.

4. The flower gift kit as claimed in claim 2 wherein said erected flower stand comprises an internal support for a base of said tube.

5. The flower gift kit as claimed in claim 1 wherein said insert comprises a flat sheet of stiff material foldable to erect said stand.

6. The flower gift kit as claimed in claim 1 wherein said erected flower stand has generally the shape of a truncated pyramid.

7. The flower gift kit as claimed in claim 1 wherein said erected flower stand includes a raised internal base.

8. The flower gift kit as claimed in claim 1 further comprises a card and wherein said erected flower stand comprises a holder for said card.

9. The flower gift kit as claimed in claim 8 wherein said holder comprises a kiss-cut in said insert.

10. The flower gift kit as claimed in claim 1 wherein said enclosure is rectangular and wherein said presentation tray is configured to hold said flower to lie along a diagonal of said rectangular box, and further comprising one or more additional gift compartments to either side of said diagonal.

11. The flower gift kit as claimed in claim 1 wherein said stand is made from a carton blank, wherein said blank comprises pre-determined fold lines and connecting tabs.

12. A flower gift kit as claimed in claim 11 wherein said 3D stand comprises a base portion, a container portion and an opening, wherein said base portion further comprises a tab with a catch, wherein in a folded 3D configuration said base portion is securely fixed within said container portion using said tab with a catch and a pre-cut slot of said container portion, and wherein said fixing acts to strengthen said 3D stand and provide internal support.

13. The flower gift kit as claimed in claim 11 wherein said flower is presented within a water-containing tube, wherein said water-containing tube contains water absorbent material to keep said cut flower hydrated during transport and display.

14. The flower gift kit as claimed in claim 13 wherein said opening of said 3D stand has a dimension such that said water-containing tube fits in said opening to maintain a stable upright position within said 3D stand.

15. The flower gift kit as claimed in claim 12 wherein said container portion of said 3D stand comprises one or more of a pre-cut slot and/or flap into which a gift card can be inserted for display.

16. The flower gift kit as claimed in claim 11 wherein the shape of said 3D stand is frusto-pyramidal, and wherein a wider part of said frustum forms the base of said 3D stand and a narrower part forms the top of said 3D stand.

17. A gift kit comprising a transport container, a cut flower and a flower display stand, wherein:
- the whole of the flower display stand is flat and in a configuration that enables it to be converted by folding into a 3D stand, and wherein said 3D stand holds said cut flower substantially upright for display;
- said flower display stand is made from a carton blank, wherein said blank comprises pre-determined fold lines, wherein the pre-determined fold lines guide a user how to fold the carton blank to erect the 3D stand; and
- said 3D stand comprises a base portion, a container portion and an opening wherein said base portion further comprises a tab with a catch and said container portion comprises a pre-cut slot, wherein
- in a folded 3D configuration said base portion is securely fixed within said container portion using said tab with a catch and said pre-cut slot of said container portion, and wherein said fixing acts to strengthen said 3D stand and provide internal support.

18. The gift kit as claimed in claim 17 wherein said blank comprises connecting tabs, and/or wherein the shape of said 3D stand is frusto-pyramidal, and wherein a wider part of said frustum forms the base of said 3D stand and a narrower part forms the top of said 3D stand.

19. The gift kit as claimed in claim 17 wherein said cut flower is presented within a water-containing tube, wherein said water-containing tube contains water absorbent material to keep said cut flower hydrated during transport and display; and/or wherein said opening of said 3D stand has a dimension such that said water-containing tube fits in said opening to maintain a stable upright position within said 3D stand.

20. The gift kit as claimed in claim 17 wherein said container portion of said 3D stand comprises one or more of a pre-cut slot and/or flap into which a gift card can be inserted for display.

* * * * *